United States Patent
Ando et al.

(10) Patent No.: US 6,248,292 B1
(45) Date of Patent: Jun. 19, 2001

(54) OVERLAY WELDING ALLOY AND ENGINE VALVE OVERLAYED THEREWITH

(75) Inventors: Kimihiko Ando, Toyota; Akio Yasuda, Mishima; Akira Manabe, Nishikamo-gun; Eiji Ito, Nagoya, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/256,296

(22) Filed: Feb. 24, 1999

(30) Foreign Application Priority Data

Feb. 25, 1998 (JP) .................................................. 10-044105
Oct. 1, 1998 (JP) .................................................. 10-292753

(51) Int. Cl.$^7$ ........................... C22C 38/44; C22C 38/52; C22C 30/00
(52) U.S. Cl. ...................... 420/585; 420/586.1; 420/429; 420/52; 420/10; 420/11; 420/102; 420/107
(58) Field of Search ................................ 420/10, 11, 123, 420/52, 57, 581, 102, 583, 107, 584.1, 585, 586.1, 429

(56) References Cited

U.S. PATENT DOCUMENTS 3,690,686 * 9/1972 Prasse et al. ........................... 420/429
5,292,382 * 3/1994 Longo .................................... 420/429

FOREIGN PATENT DOCUMENTS

| | | |
|---|---|---|
| 2433814 | 1/1976 | (DE) . |
| 0 010 545 | 5/1980 | (EP) . |
| 0 339 436 | 11/1989 | (EP) . |
| 1 269 407 | 4/1972 | (GB) . |
| 54/093641 | 7/1979 | (JP) . |
| 59-100263 | 6/1984 | (JP) . |
| 63-60095 | 3/1988 | (JP) . |
| 63-109142 | 5/1988 | (JP) . |
| 5-84592 | 4/1993 | (JP) . |
| 6-297188 | 10/1994 | (JP) . |
| 6-92627 | 11/1994 | (JP) . |
| 7-80063 | 8/1995 | (JP) . |

* cited by examiner

Primary Examiner—Deborah Yee
(74) Attorney, Agent, or Firm—Burns, Doane, Swecker & Mathis, LLP

(57) ABSTRACT

An overlaying alloy containing no Cr or a reduced amount of Cr, in which an effective amount of Mo oxide is formed even in a weak oxidizing atmosphere such as a combustion atmosphere of diesel engines and engines using CNG, LPG or other gases as a fuel to provide an improved non-damaging property and wear resistance. An overlaying alloy comprising 20–70 wt % Mo, 0.5–3 wt % C, 5–40 wt % Ni, and the balance being Fe and unavoidable impurities, which contains no Cr to facilitate formation of Mo oxide and is advantageously applied to the parts on which an oxide coating is not easily formed such as the engine parts subject to a lower temperature combustion atmosphere. An overlaying alloy comprising 20–60 wt % Mo, 0.2–3 wt % C, 5–40 wt % Ni, 0.1–10 wt % Cr, and the balance of Fe and unavoidable impurities, which contains a small amount of Cr to control formation of Mo oxide and is advantageously applied to the parts on which an oxide coating is relatively easily formed. Other alloying elements such as Mn, Co, Si, Nb may be added in the alloy in accordance with need.

11 Claims, 11 Drawing Sheets

Invention No.1

Comparison No.9

Invention No.1

Comparison No.9

Valve Body

OVERLAY WELDING ALLOY AND ENGINE VALVE OVERLAYED THEREWITH

BACKGROUND OF THE INVENTION

1. Field of the Invention

The present invention relates to an overlaying alloy advantageously usable for overlaying an engine valve of diesel engines using light oil as a fuel, engines using compressed natural gas (CNG) or liquified petroleum gas (LPG) as a fuel, or other engines in which the oxidizing power of the combustion atmosphere is weaker than that of gasoline engines.

2. Description of the Related Art

FIGS. 1A and 1B show an engine valve 1 having a valve face 2, which is required to have good properties including wear resistance, non-damaging property, heat resistance and thermal shock resistance over a wide temperature range from room temperature to elevated temperatures. The term "non-damaging property" means that an overlaid part does not significantly damage a counterpart which is in butting relationship with the overlaid part. The term "damaging property" means the intensity at which an overlaid part damages a counterpart. The heat resisting steels commonly used as a material of engine valves cannot satisfactorily provide these properties, and therefore, alloys having these properties are overlaid on the valve face to impart the required properties.

When a gasoline engine is operated, a combustion product is formed on an overlaid layer of the engine parts such as a piston ring, a valve face, and a valve seat and suppresses wear which would otherwise occur in such parts. The combustion product is substantially composed of oxides of the alloy components of the overlaid layer and acts as a protective film providing solid lubrication.

However, diesel engines using light oil as a fuel and engines using CNG, LPG or other gases as a fuel provide a combustion atmosphere having a weak oxidizing power such that the combustion product substantially composed of oxides hardly forms on the surface of the engine parts. As a result, no effective lubrication occurs and an overlaid layer of a wear resistant material only causes metal-to-metal contact between the parts leading to significant wear.

A known solution to the above problem is adding Cr and/or Mo in an alloy composing the parts of diesel engines and engines using CNG or LPG as a fuel to allow Cr oxides and/or Mo oxides to be formed on the surface of the alloy and to provide solid lubrication.

For example, Japanese Unexamined Patent Publication (Kokai) No. 59-100263 discloses an iron-based alloy as a material for thermal-spraying the pistons of diesel engines, which alloy consists of 1–4 wt % C, 10–30 wt % Cr, 10–30 wt % Mo, 1–5 wt % Nb, 20–40 wt % Co, 2–15 wt % Ni and the balance of Fe and unavoidable impurities.

Stellite alloy is generally used as an alloy for overlaying the valve face of the engine valves of engines using CNG or LPG as a fuel, which alloy consists of 1.2 wt % C, 29.8 wt % Cr, 0.01 wt % Mn, 1.35 wt % Si, 4.7 wt % W and the balance of Co and unavoidable impurities.

However, the above recited conventional overlaying alloys cannot satisfactorily provide non-damaging property and good wear resistance at practically acceptable level, and therefore, an overlaying alloy having an improved non-damaging property and wear resistance is desired.

SUMMARY OF THE INVENTION

The object of the present invention is to provide an overlaying alloy for overlaying the parts of diesel engines and engines using CNG, LPG or other gases as a fuel, which alloy allows formation of the oxide film thereon necessary for providing effective solid lubrication for an improved non-damaging property and wear resistance.

To achieve the object, the present inventors conducted various studies and found the following novel facts.

FIG. 2 shows the relationship between the heating temperature and the percent weight gain due to oxidation for simple Mo, simple Cr, Mo carbide ($MO_2C$) and Cr carbide ($Cr_3C_2$) powder samples when oxidized by heating in air. The samples are bonded with oxygen or oxidized to form oxides and are increased in the weight, so that the percent weight gain of the powder sample indicates the degree of oxidation.

It can be seen from FIG. 2 that the simple Mo and the Mo carbide show percent weight gains both being increased with a rise in the heating temperature, indicating that the degree of oxidation increases. The percent weight gain is increased mainly by an increase in the amount of Mo oxide.

The simple Cr and the Cr carbide show percent weight gains both being only slightly increased with a rise in the heating temperature, indicating that the degree of oxidation hardly increases. The percent weight gain is increased mainly by an increase in the amount of Cr oxide and the result shows that the Cr oxide is not substantially formed.

The relationship between the oxidation speed and the diffusion speed of an alloying component is believed to be essential to the formation of an oxide on the surface of an alloy by oxidation of the alloying component. Cr is relatively easily oxidized to form an oxide film on the surface of an alloy but the diffusion speed of Cr in an alloy is relatively low. The oxidation speed of Cr is significantly higher than the diffusion speed of Cr, so that the Cr present in the vicinity of the alloy surface is selectively oxidized to form a thin Cr oxide coating on the alloy surface. The thus-formed Cr oxide coating has a very dense structure to prevent entrance of oxygen from outside. Therefore, it is believed that oxidation of Cr does not significantly proceed when the heating temperature is raised. The thin Cr coating covers the alloy surface to prevent contact of the Cr present therebelow with oxygen and further formation of Cr oxide does not occur. Cr carbide has a diffusion speed lower than that of Cr and oxidation of Cr carbide is also suppressed for the same reason as Cr.

In contrast, Mo is different from Cr in that Mo is easily oxidized to form an oxide on the alloy surface, and at the same time, the diffusion speed of Mo in an alloy is low. Moreover, an Mo oxide coating formed on the alloy surface is not so dense as the Cr oxide coating and does not prevent the entrance of oxygen from outside. Therefore, even if the Mo present in the vicinity of the alloy surface is oxidized to form a thin Mo oxide coating on the alloy surface, the Mo diffuses from inside of the alloy, reaches the alloy surface, and is oxidized by oxygen entering the alloy through the thin Mo oxide coating, so that the formation of Mo oxide proceeds. The diffusion speed of Mo carbide is lower than that of Mo but the difference from the oxidation speed is not so significant as for Cr and, therefore, the oxidation of Mo carbide also proceeds with a rise in the heating temperature similarly to Mo.

Cr oxide has a standard free energy of formation smaller than that of Mo oxide and is formed more easily than the latter. Therefore, when both Mo and Cr are present, Cr and Cr carbide are oxidized before the oxidation of Mo and Mo carbide and form a thin Cr oxide coating on the alloy surface to prevent further formation of Cr oxide and Mo oxide.

Thus, when an alloy contains Cr, a thin Cr oxide coating is formed on the alloy surface, covers the alloy surface and prevents further formation of oxides, so that the amount of Cr oxide or Mo oxide is insufficient to provide effective solid lubrication for a good non-damaging property and wear resistance.

The present invention is thus based on the novel finding that an overlaying alloy containing either no Cr or a small amount of Cr is advantageously usable for overlaying an engine valve of diesel engines using light oil as a fuel, engines using compressed natural gas (CNG) or liquified petroleum gas (LPG) as a fuel, or other engines in which the oxidizing power of the combustion atmosphere is weaker than that of gasoline engines.

According to the first aspect of the present invention, there is provided an overlaying alloy, containing no Cr, comprising:

20–70 wt % Mo,
0.5–3 wt % C,
5–40 wt % Ni, and
the balance being Fe and unavoidable impurities.

The alloy containing no Cr of the first aspect is particularly advantageous for the uses in which the combustion atmosphere has a weak oxidizing power such that the presence of Cr even in a very small amount would prevent substantial formation of an oxide film on the surface of the overlaid layer. In this regard, it should also be noted that temperature is not uniform over the entire volume of the combustion chamber of an engine and a portion of the chamber at which temperature is relatively low is also a portion at which the combustion atmosphere has a weak oxidizing power.

According to the second aspect of the present invention, there is provided an overlaying alloy, containing a small amount of Cr, comprising:

20–60 wt % Mo,
0.2–3 wt % C,
5–40 wt % Ni,
0.1–10 wt % Cr,
0.1–4 wt % Si, and
the balance being Fe and unavoidable impurities.

The alloy containing a small amount of Cr of the second aspect is particularly advantageous for the uses in which the combustion atmosphere has a relatively stronger oxidizing power with respect to the uses of the first aspect alloy and a relatively larger amount of oxides are formed. A portion of the engine combustion chamber at which temperature is relatively high is also a portion at which the combustion atmosphere has a relatively strong oxidizing power. In this case, addition of a suitable amount of Cr in an overlaying alloy controls the amount of oxides formed and prevents exfoliation of an oxide film and wear caused thereby. In this way, the amount of oxides formed can be adjusted in accordance with the temperature of the parts to be overlaid with an overlaying alloy.

The overlaying alloy of the present invention contains alloying elements in amounts specified for the following reasons.

The contents of the alloying elements commonly used in both the first and second aspects are specified for the following reasons.

Mo forms Mo carbide to improve wear resistance. At the same time, Mo is also present in solid solution in an alloy, and together with the Mo carbide, is oxidized to form Mo oxide during operation of an engine, thereby improving the solid lubrication and non-damaging property. Mo must be present in an amount of 20 wt % or more in order to provide solid solution and improved non-damaging property.

However, when the Mo content is excessive, a large amount of Mo carbide forms and an overlaid layer has an excessively high hardness intensifying damaging of a counterpart. Moreover, the addition of Mo lowers thermal expansion coefficient of the alloy as a whole and increases the thermal expansion difference between the base metal and the overlaid layer to facilitate occurrence of cracking at high temperatures. Therefore, the upper limit of the Mo content is specified as 70 wt % in the Cr-free alloy of the first aspect and as 60 wt % in the Cr-containing alloy of the second aspect in which the Mo content is relatively reduced by the presence of Cr.

C is combined with Mo to form Mo carbide and, both in a solid solution and as free carbon, improves hardness of an overlaid layer to provide an improved wear resistance. This effect is not obtained when the C content is less than 0.5 wt % and, on the other hand, an overlaid layer has an excessively high hardness intensifying damaging of a counterpart. Therefore, the C content is specified to be 0.5 to 3 wt %. In the C-containing alloy of the second aspect, Cr carbide harder than Mo carbide is formed and the lower limit of the C content is reduced to 0.2 wt %.

Ni, on one hand, strengthens an alloy through solid solution strengthening mechanism and, on the other hand, increases the amount of austenite phase providing an increased amount of Mo in solid solution to improve non-damaging property. Moreover, when the base metal is austenitic, the increase in the austenite phase amount by Ni addition reduces the thermal expansion difference between the base metal and the overlaid layer to reduce possibility of cracking to occur at high temperatures. However, when the Ni content is excessively large, the overlaying alloy is composed of a single austenite phase and the Ni addition does not provide further improvement but merely raises the material cost. Therefore, the Ni amount is specified to be 5 to 40 wt %.

Mn is not essential to the present invention but, similarly to Ni, advantageously provides solid solution strengthening and increase in the austenite phase amount. It is therefore practically recommended to replace part of expensive Ni with inexpensive Mn. Mn also has deoxidizing and desulferizing effects. Presence of an excessive amount of oxygen in an alloy powder causes formation of a slag on the molten alloy during overlaying operation to degrade weldability, and in such a case, 0.01 wt % or more of Mn is preferably present in an overlaying alloy for the purpose of deoxidation. However, Mn increases the thermal expansion coefficient of an alloy, and when the base metal is austenitic, an excessive amount of Mn increases the thermal expansion difference between the base metal and the overlaid layer to facilitate occurrence of cracking during overlaying or welding. Therefore, the Mn content must be 20 wt % or less in a Cr-free alloy of the first aspect and 15 wt % or less in a Cr-containing alloy of the second aspect in which the Mn content is relatively reduced by the presence of Cr.

Co is not essential to the present invention but, similarly to Ni, advantageously provides solid solution strengthening and increase in the austenite phase amount. Co is more effective than Ni for solid solution strengthening. Therefore, part of Ni may be replaced by Co when solid solution strengthening is particularly desired. For example, in a portion of the engine combustion chamber in which the temperature is higher than that of other portions, solid solution strengthening is more stable than dispersion strengthening by carbides or other particles and addition of Co is advantageously used. However, it should be noted that presence of Co in an excessive amount facilitates formation of pin holes during welding. In the Cr-containing alloy of the second aspect, which is advantageously applied to the portions subject to a higher temperature atmosphere having a relatively stronger oxidizing power, the use of Co is important in providing high temperature strength, and to this end, up to 40 wt % Co may be present as long as the occurrence of pin holes can be prevented during welding. On the other hand, in the Cr-free alloy of the first aspect, which is advantageously applied to the portions subject to a lower temperature atmosphere having a weak oxidizing power, the use of Co is less advantageous for providing high temperature strength and Co is normally present in an amount of not more than 30 wt %.

The reasons for specifying the contents of the alloying elements commonly used in the first and second aspects are explained above.

The reasons for specifying the contents of the alloying elements only used in the second aspect will then be explained below.

The Cr content must be limited to a small amount for the following reasons. As described hereinbefore, when an overlaid layer is subject to an atmosphere having a weak oxidizing power, Cr contained in the alloy forms a thin oxide coating covering the surface of the overlaid layer to prevent further proceeding of oxidation. Therefore, it is generally true that, to allow oxides to be produced in an effective amount, the overlaying alloy should not contain Cr as specified in the first aspect.

However, for example, an engine combustion chamber includes portions in which the atmosphere temperature is relatively high such that, if Cr is not present at all, an excessive amount of oxides occasionally form to cause exfoliation of the oxide coating and the resulting wear. In such cases, the oxidation prevention effect of Cr is inversely utilized by adding a suitable amount of Cr in an overlying alloy to suppress the amount of oxides formed. However, if the Cr amount is excessive, the oxidation prevention effect of Cr or Cr oxide prevent an effective amount of oxide from being formed, and therefore, the Cr amount must be 10 wt % or less. The limitation on the Cr amount within this range also advantageously ensures toughness of the overlaid layer.

Si is preferably present because it improves the bond between an oxide coating and a base metal, and particularly when an overlaying alloy is applied to portions subject to high temperatures, Si prevents exfoliation of a thick oxide coating. Si is also advantageously used to ensure solid lubrication by the oxide coating when an overlaying alloy is applied to portions subject to low temperatures. Si thus allows an overlaying alloy to find more applications. To provide an improved bond, Si must be present in an amount of 0.1 wt % or more. However, the Si content must not be more than 4 wt % because an excessive amount of Si lowers toughness of an overlaid layer.

Nb is preferably present because it forms Nb carbide harder and finer than Mo carbide to provide an improved wear resistance while maintaining a non-damaging property. Nb carbide is more easily formed, or has a smaller free energy of formation, than Mo carbide, so that Nb preferentially forms a carbide while Mo is maintained in solid solution to provide an increased amount of Mo in solid solution allowing Mo oxide to be formed in an increased amount during working of an overlaid part, which promotes solid solution. To provide the above-mentioned effect, Nb must be present in an amount of 1 wt % or more. However, the Nb content must not be more than 15 wt % because an excessive amount of Nb lowers toughness of an overlaid layer.

Ti and V may be used to provide the effect similar to that obtained by Nb. In this case, at least one of Nb, Ti and V may be present in a total amount of 1 to 15 wt %.

DESCRIPTION OF THE PREFERRED EMBODIMENTS

EXAMPLE 1

According to a preferred embodiment of the first aspect of the present invention not using Cr, overlaying alloys having chemical compositions summarized in Table 1 as Examples No. 1 to No. 12 were melted and gas-atomized using an inert gas to produce alloy powders, which were then classified over the range of from 44 to 180 μm.

For comparison, powders of overlaying alloys having chemical compositions outside the present inventive range summarized in Table 1 as Comparative Examples No. 1 to No. 9 were also prepared in the same manner as mentioned above.

TABLE 1

| | Chemical Composition (wt %) | | | | | | | | |
|---|---|---|---|---|---|---|---|---|---|
| No. | Mo | C | Ni | Mn | Co | Cr | Si | W | Fe |
| Example | | | | | | | | | |
| 1 | 39 | 1.7 | 20.5 | 12 | — | — | — | — | Bal. |
| 2 | 30 | 1.2 | 20 | 12 | — | — | — | — | Bal. |
| 3 | 21 | 1.2 | 20 | 12 | — | — | — | — | Bal. |
| 4 | 49 | 1.4 | 17 | 10.2 | — | — | — | — | Bal. |
| 5 | 59 | 1.2 | 15 | 7.5 | — | — | — | — | Bal. |
| 6 | 67 | 1.3 | 16 | 9 | — | — | — | — | Bal. |
| 7 | 45 | 0.9 | 20 | 12 | — | — | — | — | Bal. |
| 8 | 50 | 0.6 | 20.5 | 12 | — | — | — | — | Bal. |
| 9 | 28 | 2.2 | 22 | 12 | — | — | — | — | Bal. |
| 10 | 25 | 2.8 | 20.5 | 12 | — | — | — | — | Bal. |
| 11 | 45 | 1.7 | 11 | 14 | — | — | — | — | Bal. |
| 12 | 40 | 1.8 | 6 | 18 | — | — | — | — | Bal. |
| Comparative Example | | | | | | | | | |
| 1 | 78 | 1.8 | 18 | 0 | — | — | — | — | Bal. |
| 2 | 15 | 1.8 | 21 | 12 | — | — | — | — | Bal. |
| 3 | 35 | 3.4 | 20 | 12 | — | — | — | — | Bal. |
| 4 | 40 | 0.3 | 20 | 12 | — | — | — | — | Bal. |
| 5 | 39 | 1.8 | 3 | 13 | — | — | — | — | Bal. |
| 6 | 39 | 1.7 | 16 | 25 | — | — | — | — | Bal. |
| 7 | 10 | 2 | 20 | 12 | — | 20 | — | — | Bal. |
| 8 | 20 | 2 | 20 | 12 | — | 20 | — | — | Bal. |
| 9 | — | 1.2 | — | 0.01 | Bal. | 29.8 | 1.35 | 4.7 | — |

Testing Properties

Figure 1A:
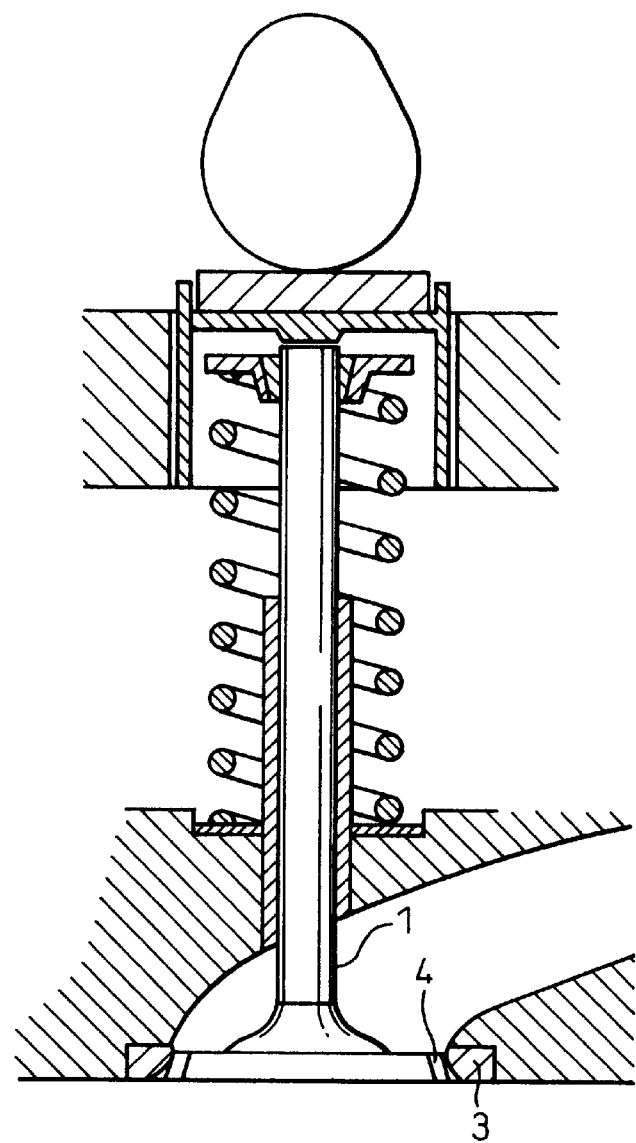
FIGS. 1A and 1B are cross-sectional views of an entire body (1A) and a head portion (1B) of an engine valve to which the present inventive overlaying alloy is advantageously applied.
Figure 1B:
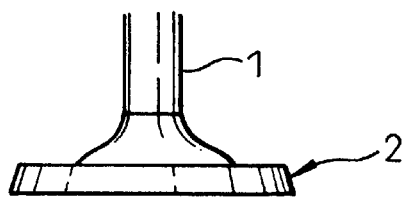
Figure 2:
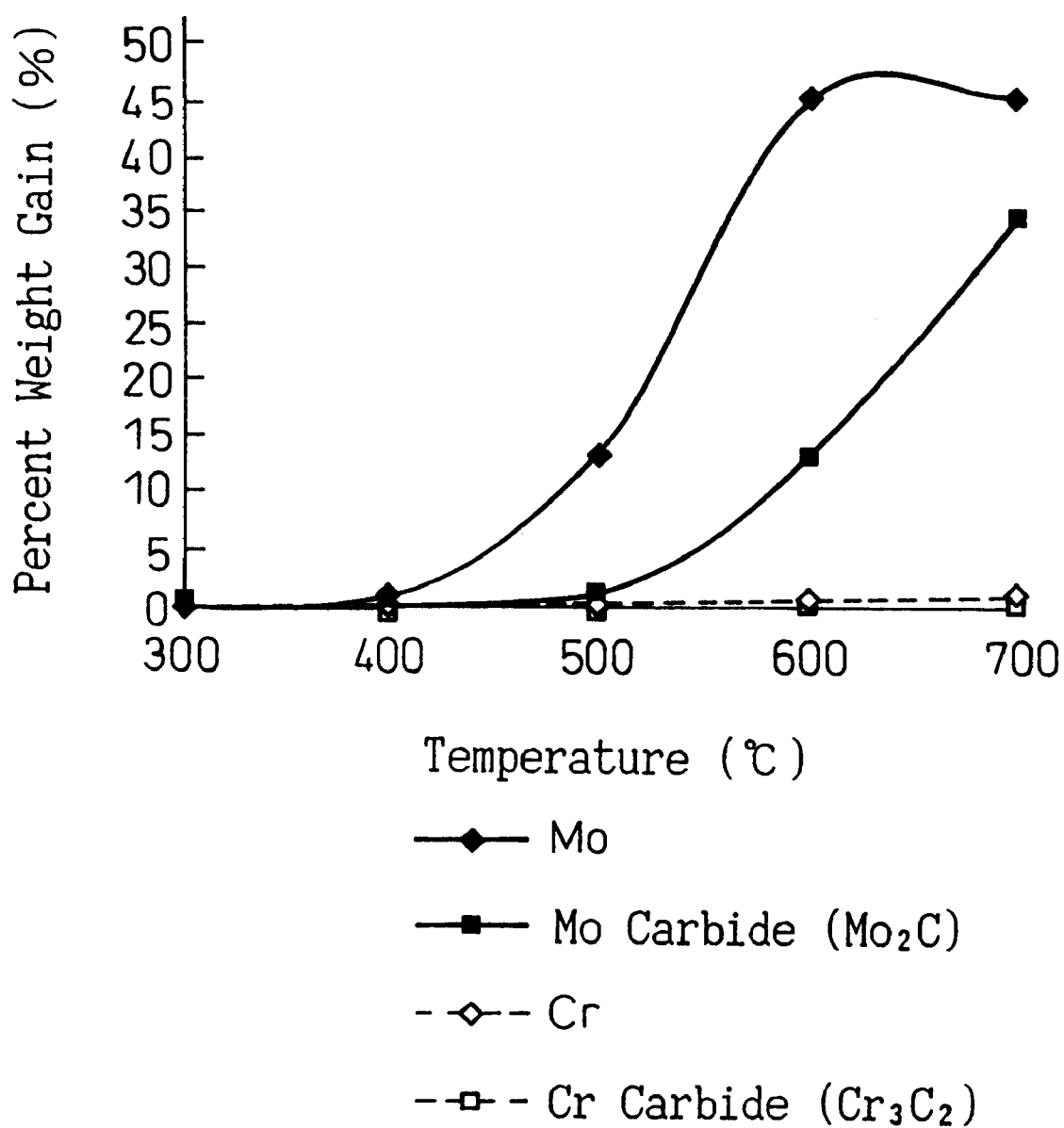
FIG. 2 is a graph showing the relationship between the heating temperature and the percent weight gain during oxidation of simple Mo, Mo carbide, simple Cr and Cr carbide.

Plasma welding was performed at a current of 90 A and a welding speed of 5 mm/sec by using the above-prepared alloy powders to form an overlaid layer 4 on a valve face 2 of an engine valve 1 made of an austenitic heat resistant steel (JIS SUH35) and having the structure shown in FIG. 1. The following tests were performed to evaluate properties of the overlaying alloys. The results are summarized in Table 2.

TABLE 2

| No. | | Weldability (*1) | Non-damaging property (mm) | Wear resistance (μm) | Thermal shock resistance (*2) |
|---|---|---|---|---|---|
| Example | 1 | 4 | 0.06 | 10 | ○ |
| | 2 | 4 | 0.08 | 12 | ○ |
| | 3 | 4 | 0.10 | 13 | ○ |
| | 4 | 4 | 0.05 | 9 | ○ |
| | 5 | 4 | 0.04 | 9 | ○ |
| | 6 | 4 | 0.07 | 7 | ○ |
| | 7 | 4 | 0.06 | 13 | ○ |
| | 8 | 4 | 0.06 | 14 | ○ |
| | 9 | 4 | 0.08 | 9 | ○ |
| | 10 | 4 | 0.10 | 8 | ○ |
| | 11 | 4 | 0.07 | 10 | ○ |
| | 12 | 4 | 0.08 | 9 | ○ |
| Comparative Example | 1 | 3 | 0.20 | 18 | x |
| | 2 | 4 | 0.23 | 21 | ○ |
| | 3 | 4 | 0.30 | 20 | ○ |
| | 4 | 4 | 0.10 | 20 | ○ |
| | 5 | 4 | 0.20 | 3 | x |
| | 6 | 2 | 0.10 | 16 | ○ |
| | 7 | 4 | 0.30 | 20 | ○ |
| | 8 | 2 | 0.06 | 20 | x |
| | 9 | 4 | 0.31 | 25 | ○ |

(*1) 4: Weld zone contains no cavity and is smooth and well bonded.
3: Weld zone contains cavities but is well bonded.
2: Weld zone contains cavities and is incompletely bonded.
1: Weld zone contains many cavities and incompletely bonded.
(*2) ○: No cracks.
x: Cracks observed.

Weldability

In the above-mentioned plasma overlay welding, weldability was evaluated in four grades in terms of a bead shape, cracking in the weld zone, etc. In Table 2, larger numbers mean better properties such that the weld zone has a smoother appearance including less or no blow holes and unwelded cavities and has a completely solid cross-section.

Damaging property and Wear resistance

Figure 3:
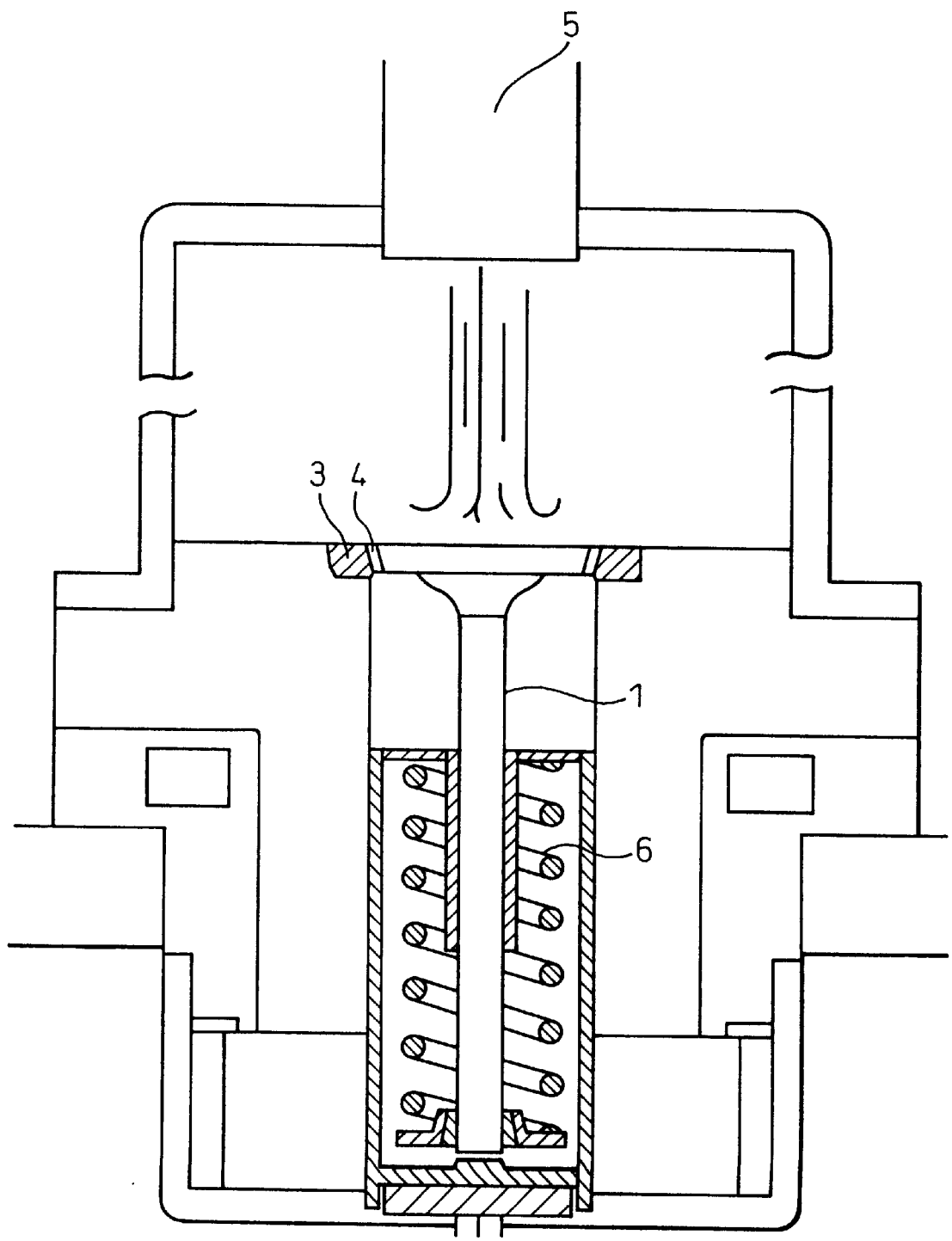
FIG. 3 is a cross-sectional view of an apparatus for testing damaging property and wear resistance.

The overlaid layers were tested for non-damaging property and wear resistance by using the testing apparatus shown in FIG. 3. A propane gas burner 5 was used as a heating device, which produced a propane gas combustion atmosphere to surround a sliding contact interface between the overlaid valve face 2 and the valve seat 3 of an iron-based sintered material. A wear test was carried out under the conditions that the temperature of the valve seat 3 was regulated at 300° C., a spring 6 was used to load 18 kgf on the interface upon contact of the valve face 2 and the valve seat 3, and the valve face 2 and the valve seat 3 were brought into contact with each other at a rate of 2000 times/min for a duration of 8 hours. After the wear test, the increase in the butting width of the valve seat 3 was measured to evaluate damaging property of the overlaying alloy and the wear depth of the valve face 2 was measured to evaluate wear resistance of the overlaying alloy.

The term "the increase in the butting width of valve seat" is used herein to mean an increase in the width of the area of valve seat in contact with a valve face due to wear of the valve seat through repeated contact with the valve face.

The term "the wear depth of valve face" is used herein to mean the depth to which the area of valve face in contact with a valve seat was worn through repeated contact with the valve seat.

Thermal shock resistance

The engine valves 1 having the overlaid layer 4 were heated at 900° C. in a furnace and furnace-cooled to room temperature. The overlaid layer was then inspected for cracks.

Summary of Evaluation

As can be seen from Table 2, the overlaid layer has a good weldability, non-damaging property, wear resistance and thermal shock resistance in Examples No. 1 to No. 12, in which the overlaid layer was formed by using overlaying alloys having chemical compositions within the specified range of the present invention.

In Comparative Example No. 9, the overlaid layer was formed by using the conventional stellite alloy and has a poor non-damaging property and wear resistance although weldability and thermal shock resistance are acceptable.

In Comparative Examples No. 7 and No. 8, the overlaid layer was formed by using an iron-based alloy containing Cr and Mo and has a poor non-damaging property and weldability.

These results show that Cr oxide does not provide good solid lubrication in a propane gas combustion atmosphere and that an increase in the Cr content hardens the overlaid layer to produce an adverse effect on non-damaging property and weldability.

Comparative Examples No. 1 to No. 6 also show that any one of weldability, non-damaging property, wear resistance and thermal shock resistance is poor when the overlaying alloy has a chemical composition outside the present inventive range.

In Comparative Example No. 1, the Mo content is more than the present inventive range, so that the overlaid layer contains an excessive amount of Mo carbide to provide an increased hardness and has a poor non-damaging property and thermal shock resistance.

In Comparative Example No. 2, the Mo content is less than the present inventive range and the overlaid layer does not provide good solid lubrication by Mo oxide and has a poor non-damaging property.

In Comparative Example No. 3, the C content is more than the present inventive range, so that the overlaid layer contains an excessive amount of C to provide an increased hardness and has a poor non-damaging property.

In Comparative Example No. 4, the C content is less than the present inventive range, so that the overlaid layer does not contain a sufficient amount Mo carbide to provide a decreased hardness and has a poor wear resistance.

In Comparative Example No. 5, the Ni content is less than the present inventive range, so that the overlaid layer is incompletely austenitized and has a poor thermal shock resistance and non-damaging property.

In Comparative Example No. 6, the Mn content is more than the present inventive range, so that cracking occurred during welding and weldability is poor.

Durability test

Examples No. 1 and No. 5 having a valve face 2 overlaid with the present inventive alloy and Comparative Example No. 9 having a valve face 2 overlaid with the conventional stellite alloy were used as an exhaust valve of an engine using LPG gas as a fuel and having a displacement of 2700 cc. After a durability test for 150 hours, engine valve protrusion and increase in valve seat butting width were measured. The term "engine valve protrusion" means an outward displacement (a protrusion) of the valve position upon valve closing from the original position due to the valve face wear (which relates to wear resistance) and the valve seat wear (which relates to non-damaging property).

Figure 4:
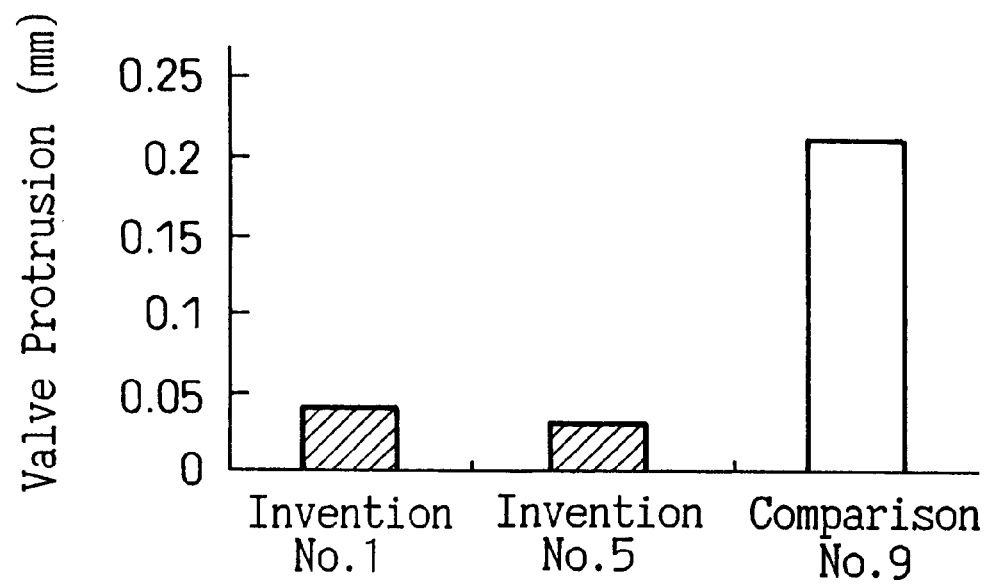
FIG. 4 is a graph showing valve protrusions after a durability test compared between Examples No. 1 and No. 5 of the first aspect of the present invention and Comparative Example No. 9.
Figure 5:
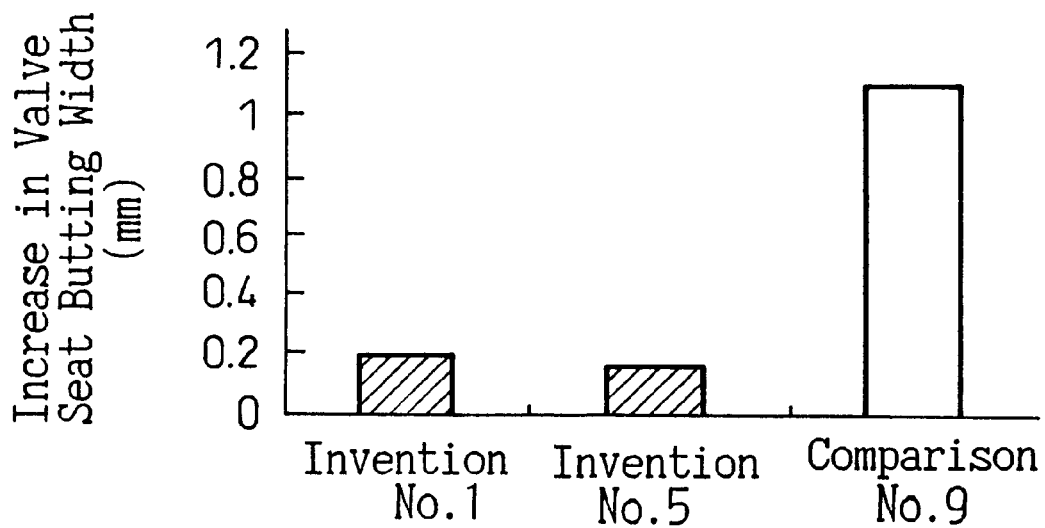
FIG. 5 is a graph showing increase in valve sheet butting width after a durability test of Examples No. 1 and No. 5 of the first aspect of the present invention and Comparative Example No. 9.

The results are summarized in FIGS. 4 and 5, from which it can be seen that, when used as an exhaust valve of an engine using LPG gas as a fuel, Examples No. 1 and No. 5 of the present invention have a reduced increase in valve seat butting width and a reduced valve protrusion, indicating an improved non-damaging property and wear resistance with respect to Comparative Example No. 9.

Figure 6:
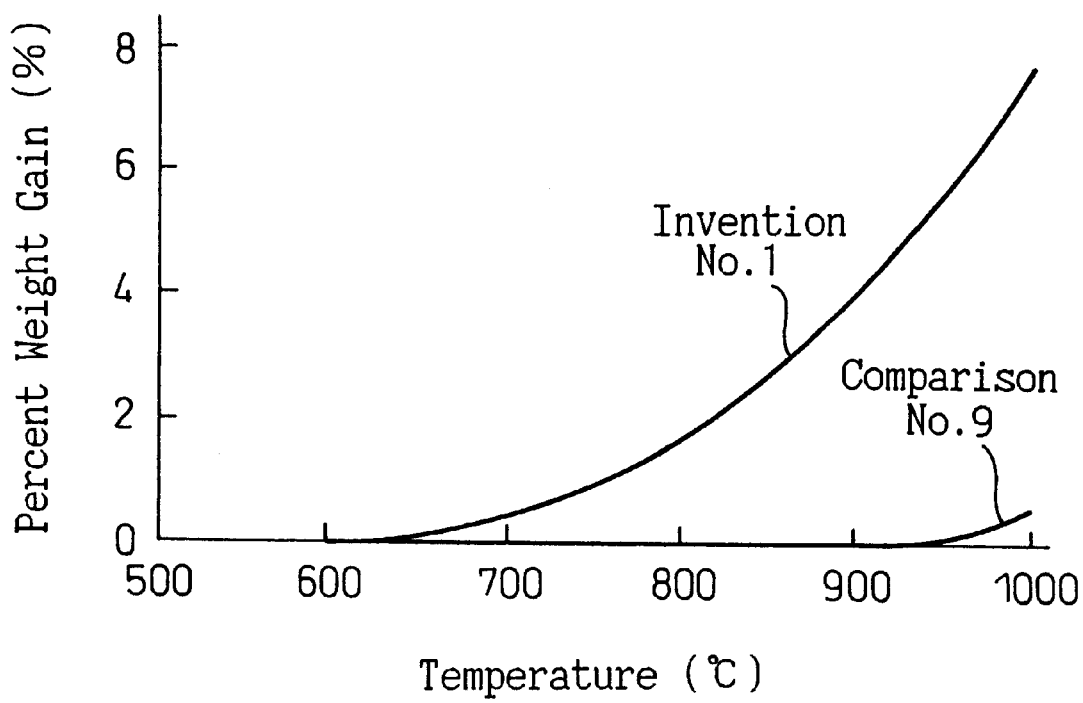
FIG. 6 is a graph showing the relationship between the heating temperature and the percent weight gain during oxidation of Example No. 1 of the first aspect of the present invention and Comparative Example No. 9.

FIG. 6 shows the relationship between the heating temperature and the percent weight gain by oxidation for Example No. 1 and Comparative Example No. 9 oxidized by heating in air. When alloying components in an alloy are bonded with oxygen to form oxide, the entire weight of the alloy is increased, and therefore, it is believed that the percent weight gain represents the degree to which oxidation has proceeded.

Comparing the percent weight gain between Example No. 1 and Comparative Example No. 9, Example No. 1 increases in weight as the temperature is raised to indicate that alloying element(s) of Example No. 1 is progressively oxidized as the temperature is raised, whereas Comparative Example No. 9 gains little weight as the temperature is raised to show that alloying element(s) of Comparative Example No. 9 is not substantially oxidized.

Figure 7:
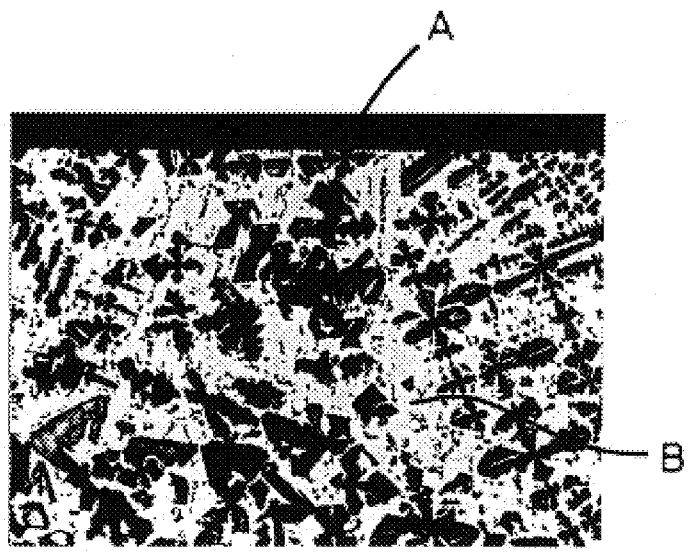
FIG. 7 is a microphotograph at a magnification of 400 showing the microstructure, before a durability test, of the overlaid layer 4 formed using Example No. 1 of the first aspect of the present invention.
Figure 8:
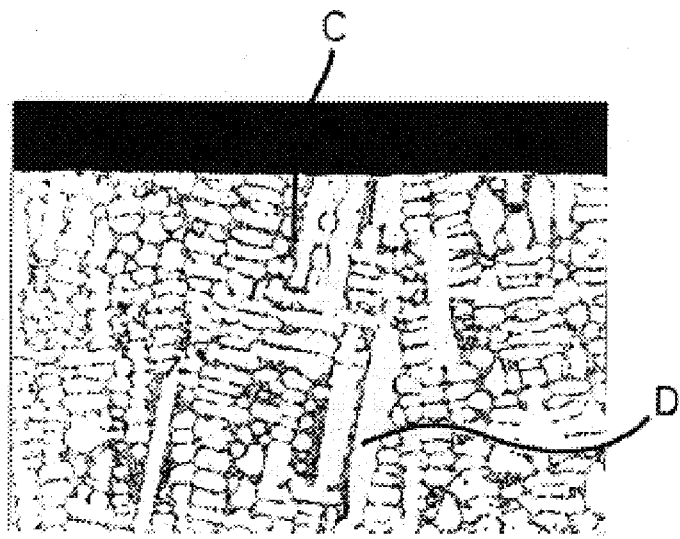
FIG. 8 is a microphotograph at a magnification of 400 showing the microstructure, before a durability test, of the overlaid layer 4 formed by using the Comparative Example No. 9 as compared to the first aspect of the present invention (or Comparative Example No. 12 as compared to the second aspect)
Figure 9:
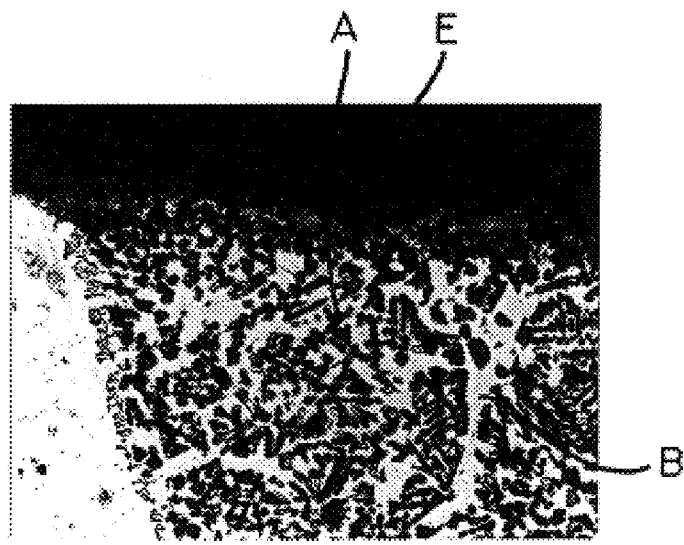
FIG. 9 is a microphotograph, at a magnification of 400, showing the microstructure, after a durability test, of the overlaid layer 4 formed using Example No. 1 of the first aspect of the present invention.
Figure 10:
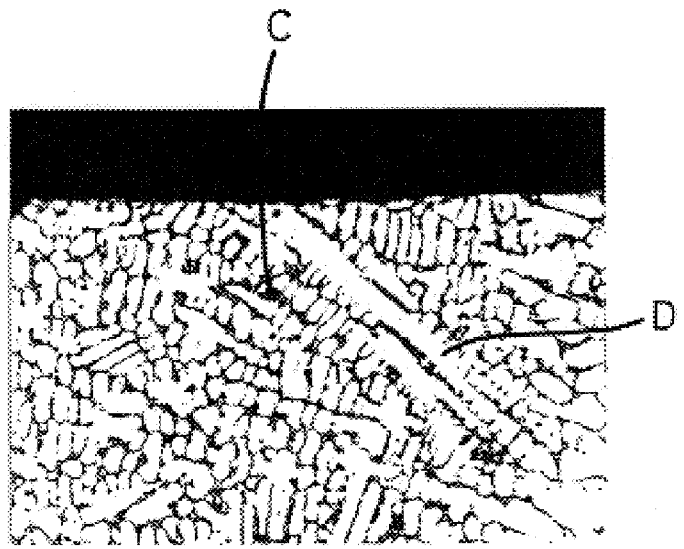
FIG. 10 is a microphotograph, at a magnification of 400, showing the microstructure, after a durability test, of the overlaid layer 4 formed by using the Comparative Example No. 9 as compared to the first aspect of the present invention.

Microstructures of the overlaid layers of Example No. 1 and Comparative Example No. 9 in a core portion not contacting a valve seat are shown in FIGS. 7 and 8, respectively, for the state before the durability test, and in FIGS. 9 to 10, respectively, for the state after the durability test.

In FIGS. 7 to 10, in Example No. 1, a dark gray portion A is a hard phase of Mo carbide and a bright portion B is a metal matrix, and in Comparative Example No. 9, a gray portion C is a hard phase of Cr carbide or W carbide and a bright portion D is a metal matrix.

Comparing FIGS. 9 and 10, in Comparative Example No. 9 of FIG. 10, no change is observed in the microstructure after the durability test, while in Example No. 1 of FIG. 9, a substantial change is observed in portion E of a metal matrix.

Then, proportions of atoms present in the surface of the valve face after the durability test were studied by EPMA to show that oxygen atoms are present in a proportion of about 30% in Example No. 1 and in a proportion as small as about 15% in Comparative Example No. 9.

This result indicates that the microstructure is changed by oxidation in Example No. 1 of FIG. 9 and that Example No. 1 allows a solid lubricating Mo oxide to be formed by oxidation of Mo and Mo carbide in the overlaid layer even in a weak oxidizing atmosphere of engines using a gas as a fuel. In Comparative Example No. 9, the smaller proportion of oxygen atoms indicates oxide formation in a smaller amount.

EXAMPLE 2

According to a preferred embodiment of the second aspect of the present invention using Cr, overlaying alloys having chemical compositions summarized in Table 3 as Examples No. 1 to No. 16 were melted and gas-atomized using an inert gas to produce alloy powders, which were then classified over the range of from 44 to 180 μm.

For comparison, powders of overlaying alloys having chemical compositions outside the present inventive range, summarized in Table 3 as Comparative Examples No. 1 to No. 13, were also prepared in the same manner as mentioned above. Comparative Examples No. 1 to No. 11 contain the same alloying elements as those contained in Examples of the present invention but one of the alloying elements is present in an amount outside the present inventive range. Comparative Examples No. 12 and No. 13 are conventional stellite alloy and conventional tribaloy.

TABLE 3

Chemical Composition (wt %)

| No. | Mo | C | Ni | Mn | Co | Cr | Si | Nb | W | Fe |
|---|---|---|---|---|---|---|---|---|---|---|
| Example | | | | | | | | | | |
| 1 | 34 | 0.85 | 10 | 6 | 30 | 4 | 1.1 | | | Bal. |
| 2 | 22 | 0.8 | 9 | 6 | 28 | 5 | 1.2 | | | Bal. |
| 3 | 45 | 0.7 | 10 | 5 | 23 | 4 | 1 | | | Bal. |
| 4 | 57 | 0.6 | 9 | 5 | 15 | 3 | 1.1 | | | Bal. |
| 5 | 33 | 0.3 | 10 | 5 | 28 | 4 | 1.5 | | | Bal. |
| 6 | 30 | 1.6 | 12 | 5 | 28 | 4 | 0.9 | | | Bal. |
| 7 | 25 | 2.5 | 15 | 4 | 28 | 3 | 0.8 | | | Bal. |
| 8 | 30 | 0.8 | 6 | 7 | 25 | 4 | 1.1 | | | Bal. |
| 9 | 31 | 0.7 | 11 | 13 | 25 | 3 | 1 | | | Bal. |
| 10 | 33 | 0.8 | 12 | 5 | 27 | 0.2 | 1.2 | | | Bal. |
| 11 | 32 | 0.7 | 15 | 4 | 25 | 9 | 1.2 | | | Bal. |
| 12 | 33 | 0.8 | 12 | 6 | 27 | 4 | 0.2 | | | Bal. |
| 13 | 29 | 0.6 | 11 | 4 | 28 | 3 | 2.4 | | | Bal. |
| 14 | 27 | 0.7 | 13 | 4 | 27 | 3 | 3.5 | | | Bal. |
| 15 | 26 | 0.7 | 10 | 5 | 25 | 4 | 1.2 | 2 | | Bal. |
| 16 | 27 | 0.7 | 11 | 5 | 27 | 4 | 1 | | 12 | Bal. |
| Comparative Example | | | | | | | | | | |
| 1 | 15 | 1 | 15 | 5 | 28 | 4 | 1.2 | | | Bal. |
| 2 | 65 | 0.9 | 10 | 6 | 6 | 4 | 1.4 | | | Bal. |
| 3 | 30 | | 14 | 5 | 29 | 3 | 1.3 | | | Bal. |
| 4 | 29 | 3.5 | 12 | 5 | 27 | 3 | 1.1 | | | Bal. |
| 5 | 32 | 0.9 | 3 | 10 | 30 | 4 | 1.2 | | | Bal. |
| 6 | 31 | 0.8 | 12 | 18 | 21 | 4 | 0.9 | | | Bal. |
| 7 | 28 | 0.7 | 8 | 5 | 42 | 3 | 1.1 | | | Bal. |
| 8 | 32 | 0.9 | 10 | 4 | 24 | 13 | 1 | | | Bal. |
| 9 | 31 | 0.85 | 14 | 4 | 26 | 4 | 0.03 | | | Bal. |
| 10 | 34 | 0.5 | 16 | 5 | 23 | 3 | 4.5 | | | Bal. |
| 11 | 30 | 0.6 | 12 | 5 | 25 | 4 | 1.2 | 19 | | Bal. |
| 12 | | 1.2 | | 0.01 | Bal. | 29.8 | 1.35 | | 4.7 | |
| 13 | 28 | | | | Bal. | 8 | 2 | | | |

Testing Properties

By using the above-prepared alloy powders, plasma overlay welding and tests were conducted in the same manner as in Example 1, except that damaging property and wear resistance were tested at two valve seat temperatures of 200° C. and 300° C. and thermal shock resistance was tested at a furnace temperature of 900° C. summarized in Table 4.

TABLE 4

| No. | Weld-ability (*1) | Non-damaging property (mm) 200° C. | Non-damaging property (mm) 300° C. | Wear resistance ($\mu$m) 200° C. | Wear resistance ($\mu$m) 300° C. | Thermal shock resistance (*2) |
|---|---|---|---|---|---|---|
| Example | | | | | | |
| 1 | 4 | 0.07 | 0.03 | 8 | 4 | o |
| 2 | 4 | 0.09 | 0.04 | 9 | 5 | o |
| 3 | 4 | 0.08 | 0.04 | 7 | 3 | o |
| 4 | 4 | 0.09 | 0.05 | 6 | 2 | o |

TABLE 4-continued

| No. | Weld-ability (*1) | Non-damaging property (mm) 200° C. | Non-damaging property (mm) 300° C. | Wear resistance ($\mu$m) 200° C. | Wear resistance ($\mu$m) 300° C. | Thermal shock resistance (*2) |
|---|---|---|---|---|---|---|
| 5 | 4 | 0.06 | 0.03 | 10 | 6 | o |
| 6 | 4 | 0.08 | 0.04 | 7 | 4 | o |
| 7 | 4 | 0.1 | 0.07 | 6 | 3 | o |
| 8 | 4 | 0.09 | 0.05 | 8 | 5 | o |
| 9 | 4 | 0.08 | 0.04 | 8 | 4 | o |
| 10 | 4 | 0.04 | 0.07 | 4 | 7 | o |
| 11 | 4 | 0.09 | 0.04 | 9 | 4 | o |
| 12 | 4 | 0.08 | 0.04 | 9 | 6 | o |
| 13 | 4 | 0.07 | 0.04 | 7 | 3 | o |
| 14 | 4 | 0.09 | 0.04 | 6 | 3 | o |
| 15 | 4 | 0.05 | 0.03 | 6 | 4 | o |
| 16 | 4 | 0.05 | 0.04 | 2 | 2 | o |
| Comparative Example | | | | | | |
| 1 | 4 | 0.18 | 0.15 | 10 | 7 | o |
| 2 | 4 | 0.2 | 0.18 | 8 | 6 | x |
| 3 | 4 | 0.07 | 0.04 | 20 | 18 | o |
| 4 | 4 | 0.23 | 0.2 | 6 | 4 | o |
| 5 | 4 | 0.2 | 0.17 | 7 | 7 | x |
| 6 | 2 | 0.08 | 0.04 | 7 | 4 | o |
| 7 | 2 | 0.06 | 0.03 | 7 | 4 | o |
| 8 | 2 | 0.2 | 0.16 | 7 | 3 | o |
| 9 | 4 | 0.1 | 0.07 | 21 | 15 | o |
| 10 | 2 | 0.08 | 0.05 | 7 | 5 | o |
| 11 | 2 | 0.07 | 0.05 | 3 | 3 | o |
| 12 | 4 | 0.35 | 0.3 | 27 | 24 | o |
| 13 | 4 | 0.07 | 0.04 | 6 | 4 | x |

(*1)
4: Weld zone contains no cavity and is smooth and well bonded.
3: Weld zone contains cavities but is well bonded.
2: Weld zone contains cavities and is incompletely bonded.
1: Weld zone contains many cavities and incompletely bonded.
(*2)
o: No cracks
x: Cracks observed.

Summary of Evaluation

As can be seen from Table 4, the overlaid layer has a good weldability, non-damaging property, wear resistance and thermal shock resistance in Examples No. 1 to No. 16, in which the overlaid layer was formed by using overlaying alloys having chemical compositions within the specified range of the present invention.

In Comparative Example No. 12, the overlaid layer was formed by using the conventional stellite alloy and has a poor non-damaging property and wear resistance although weldability and thermal shock resistance are acceptable.

In Comparative Example No. 13, the overlaid layer was formed by using the conventional tribaloy and has a poor thermal shock resistance although weldability, non-damaging property and wear resistance are acceptable.

Comparative Example No. 1 contains less Mo than the present inventive range and has a poor non-damaging property.

Comparative Example No. 2 contains more Mo than the present inventive range and has a poor non-damaging property and thermal shock resistance.

Comparative Example No. 3 contains no C and has a poor wear resistance.

Comparative Example No. 4 contains more C than the present inventive range and has a poor non-damaging property.

Comparative Example No. 5 contains less Ni than the present inventive range and has a poor thermal shock resistance and non-damaging property.

Comparative Example No. 6 contains more Mn than the present inventive range and has a poor weldability.

Comparative Example No. 7 contains more Co than the present inventive range and has a poor weldability.

Regarding the Cr content, comparison between Examples of the present invention shows that Example No. 1 containing a lager amount of Cr exhibits a non-damaging property and a wear resistance, which are superior at a lower testing temperature of 200° C. but are inferior at a higher testing temperature of 300° C. with respect to Example No. 10.

In contrast, Comparative Example No. 8 contains more Cr than the present inventive range and has a poor non-damaging property, wear resistance and weldability at both lower and higher testing temperatures.

Comparative Example No. 9 contains less Si than the present inventive range and has a poor wear resistance and non-damaging property.

Comparative Example No. 10 contains more Si than the present inventive range and has a poor weldability.

Comparative Example No. 11 contains more Nb than the present inventive range and has a poor weldability.

Durability test

Examples No. 1, No. 10 and No. 16 having a valve face 2 overlaid with the present inventive alloy and Comparative Examples No. 12 and No. 13 having a valve face 2 overlaid with the conventional stellite alloy or the conventional tribaloy were used as an exhaust valve of an engine using CNG gas as a fuel and having a displacement of 2200 cc. After a durability test for 180 hours, engine valve protrusion and increase in valve seat butting width were measured. The term "engine valve protrusion" means an outward displacement (a protrusion) of the valve position upon valve close from the original position due to the valve face wear (which relates to wear resistance) and the valve seat wear (which relates to non-damaging property).

Figure 11:
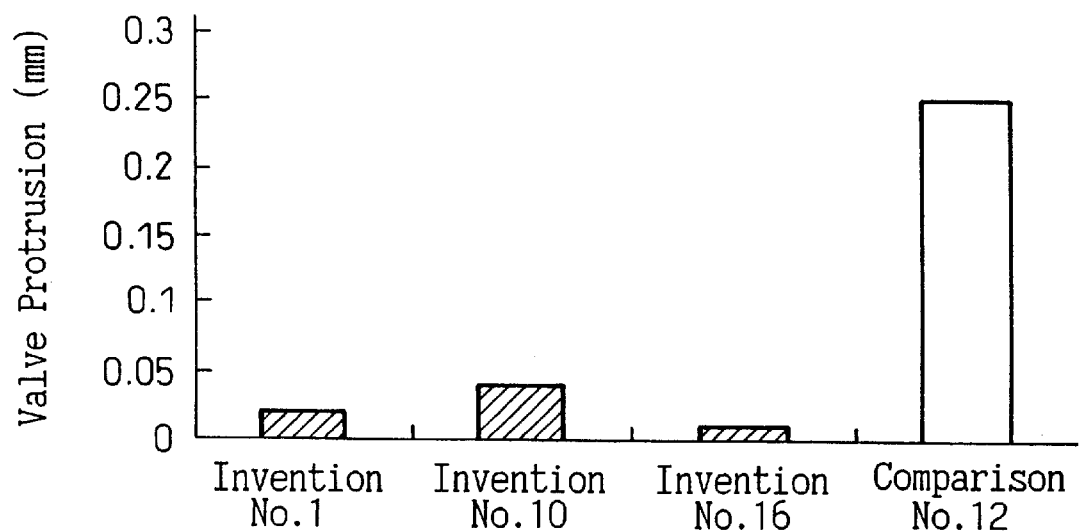
FIG. 11 is a graph showing valve protrusions after a durability test for Examples No. 1, No. 10, and No. 16 of the second aspect of the present invention and Comparative Example No. 12.
Figure 12:
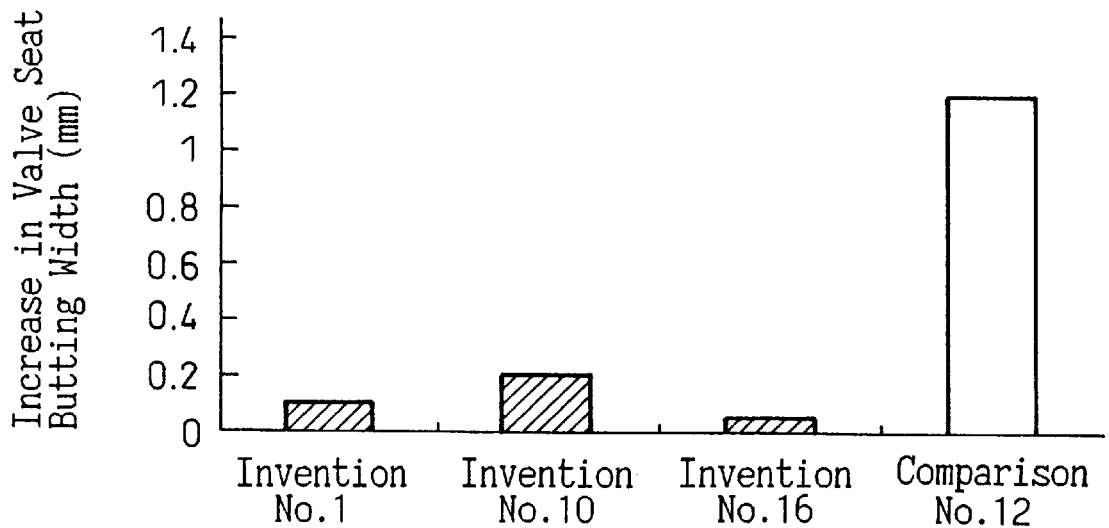
FIG. 12 is a graph showing increase in valve butting width after a durability test for Examples No. 1, No. 10, and No. 16 of the second aspect of the present invention and Comparative Example No. 12.

The results are summarized in FIGS. 11 and 12, from which it can be seen that, when used as an exhaust valve of an engine using CNG gas as a fuel, Examples No. 1, No. 10 and No. 16 of the present invention have a reduced increase in valve seat butting width and a reduced valve protrusion, indicating an improved non-damaging property and wear resistance with respect to Comparative Example No. 12. In Comparative Example 13 using tribaloy, the overlaid layer 4 included cracks. This is because the tribaloy of Comparative Example No. 13 had an extremely high hardness of HV660 while Examples No. 1, No. 10 and No. 16 and Comparative Example No. 12 had hardnesses of HV480, 450, 500 and 450, respectively.

Comparison between Examples of the present invention shows that Example No. 1 containing a larger amount of Cr exhibits a smaller increase in valve seat butting width and valve protrusion than that of Example No. 10, indicating a better non-damaging property and wear resistance. Example No. 16 containing Nb has a further smaller valve protrusion.

Figure 13:
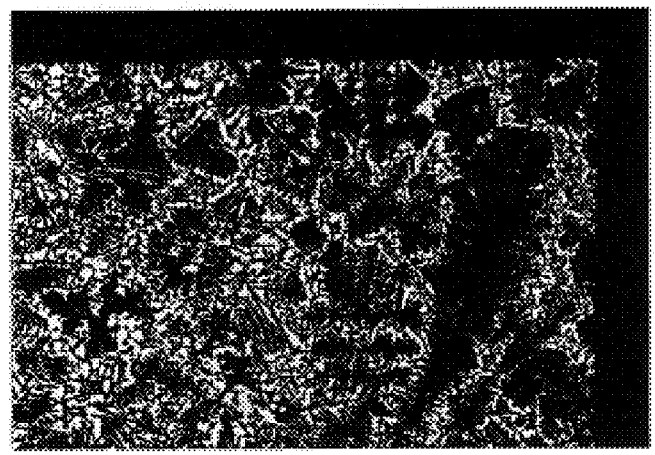
FIG. 13 is a microphotograph, at a magnification of 400, showing the microstructure, before a durability test, of the overlaid layer 4 formed using Example No. 1 of the second aspect of the present invention.
Figure 14:
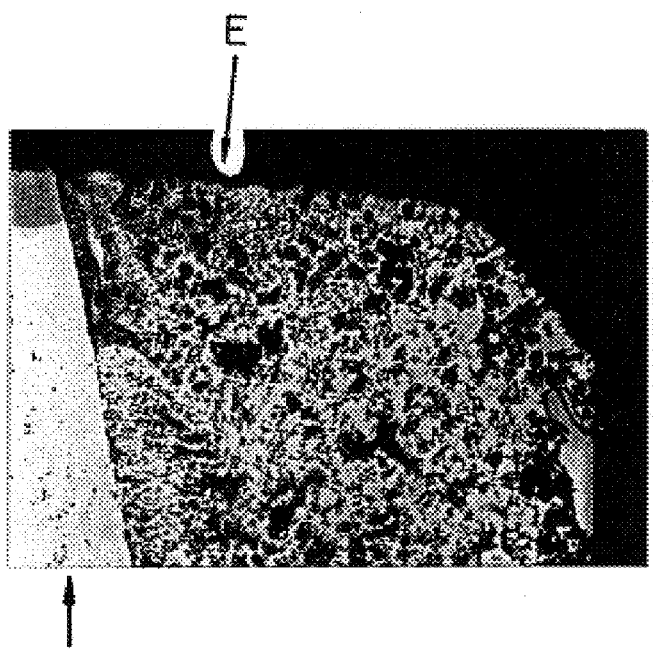
FIG. 14 is a microphotograph at a magnification of 400 showing the microstructure, after a durability test, of the overlaid layer 4 formed using Example No. 1 of the second aspect of the present invention.
Figure 15:
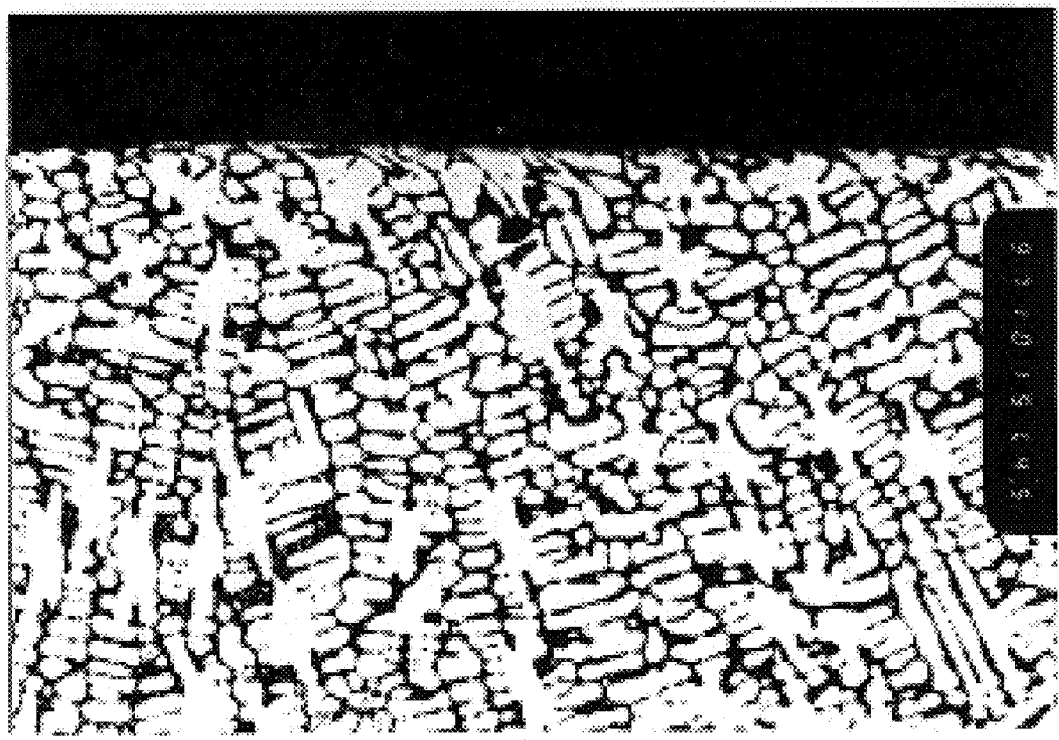
FIG. 15 is a microphotograph at a magnification of 400 showing the microstructure, after a durability test, of the overlaid layer 4 formed using Comparative Example No. 12 of the second aspect of the present invention.

Microstructures of the overlaid layers of Example No. 1 and Comparative Example No. 12 in a core portion not contacting a valve seat are shown in FIG. 13 and FIG. 8 (the same as Comparative Example No. 9 in Example 1), respectively, for the state before the durability test, and in FIGS. 14 and 15, respectively, for the state after the durability test.

In FIGS. 13, 8, 14 and 15, in Example No. 1, a dark gray portion A is a hard phase of Mo carbide and a bright portion B is a metal matrix, and in Comparative Example No. 12, a gray portion C is a hard phase of Cr carbide or W carbide and a bright portion D is a metal matrix.

Comparing FIGS. 14 and 15, in Comparative Example No. 12 of FIG. 15, no change is observed in the microstructure after the durability test, while in Example No. 1 of FIG. 14, a substantial change is observed in portion E of a metal matrix.

Then, the proportions of the atoms present in the surface of the valve face after the durability test were studied by EPMA to show that oxygen atoms are present in a proportion of about 20% in Example No. 1 and in a proportion as small as about 10% in Comparative Example No. 12. Therefore, oxides are formed in a greater amount in Example No. 1 than in Comparative Example No. 12. Example No. 10 contains less Cr than Example No. 1 and has a greater amount of oxides, although it has a larger valve extrusion. This is considered to be because the oxide amount is excessive.

Figure 16:
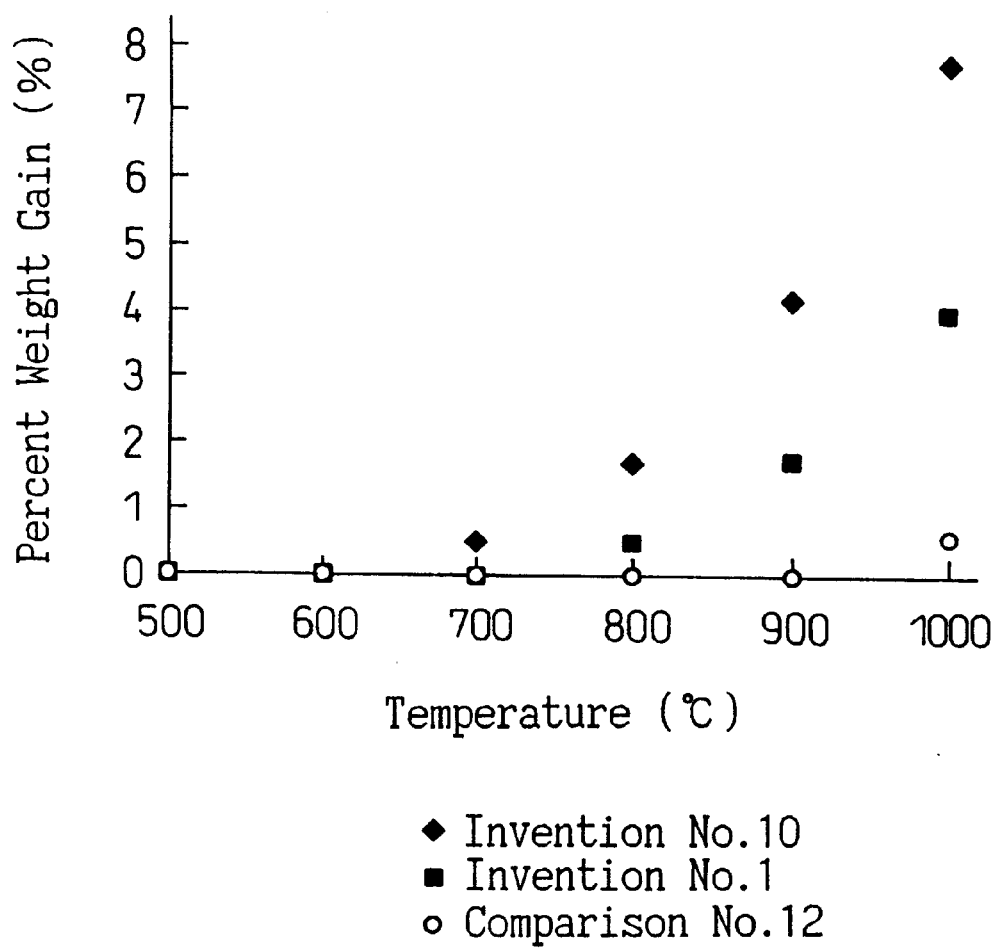
FIG. 16 is a graph showing the relationship between the heating temperature and the percent weight gain during oxidation of Examples No. 1 and No. 10 of the second aspect of the present invention and Comparative Example 12.

FIG. 16 shows the relationship between the heating temperature and the percent weight gain by oxidation when the alloy powders of Examples No. 1 and No. 10 and Comparative Example No. 12 are oxidized by heating in air.

Oxidation proceeded to a greater degree in Examples No. 1 and No. 10 than in Comparative Example No. 12. Oxidation started at a higher temperature in Example No. 1 containing a larger amount of Cr than in Example No. 10 containing a smaller amount of Cr.

This shows that the degree of oxidation, particularly the amount of Mo oxide, can be controlled by the Cr content.

As described herein, the present invention provides an overlaying alloy containing no Cr or a reduced amount of Cr, in which an effective amount of Mo oxide is formed even in a weak oxidizing atmosphere such as a combustion atmosphere of diesel engines and engines using CNG, LPG or other gases as a fuel to provide an improved non-damaging property and wear resistance.

What is claimed is:

1. An overlay welding alloy comprising:

20–60 wt % Mo, 0.2–3 wt % C,

5–40 wt % Ni,

15–40 wt % Co, 0.1–10 wt % Cr, and the balance Fe and unavoidable impurities.

2. The overlay welding alloy according to claim 1, further comprising 15 wt % or less Mn.

3. The overlay welding alloy according to claim 1, further comprising 0.1–4 wt % Si.

4. The overlay welding alloy according to claim 1, further comprising 1–15 wt % Nb.

5. An engine valve having a valve face overlayed with an overlaying alloy according to claim 1.

6. An engine valve according to claim 5, designed for gas engines.

7. A welding overlay consisiting essentially of the overlay welding alloy according to claim 1.

8. A welded overlay consisting essentially of the overlay welding alloy according of claim 3.

9. A welded overlay consisting essentially of the overlay welding alloy according to claim 4.

10. The overlay welding alloy according to claim 1 wherein the Cr content is 0.1 to 9%.

11. An overlay welding alloy consisting essentially of:

20–60 wt % Mo, 0.2–3 wt % C,

5–40 wt % Ni,

15–40 wt % Co, 0.1–10 wt % Cr, and the balance Fe and unavoidable impurities.

* * * * *